Aug. 10, 1948.                J. M. STRANG ET AL                    2,446,726
                    RANGEFINDER, HEIGHTFINDER, AND LIKE
                        OPTICAL OBSERVATION INSTRUMENTS
                           Filed Dec. 1, 1944
FIG.:1.       FIG.:2.       FIG.:3.
PRIOR ART
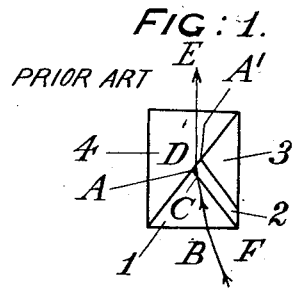 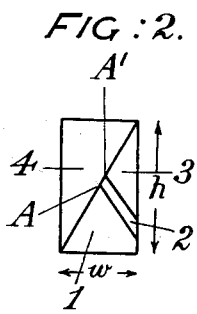 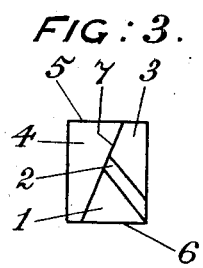
FIG.:4.        FIG.:5.
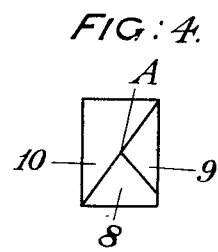
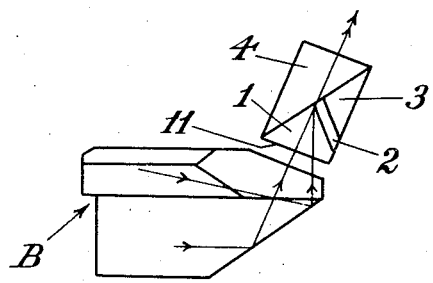
FIG.:10.
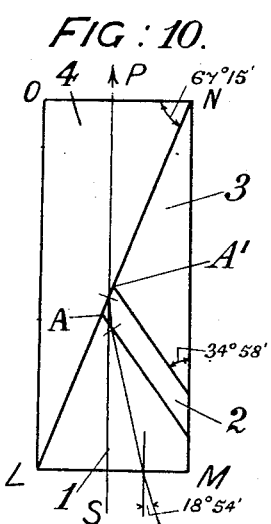
FIG.:6.
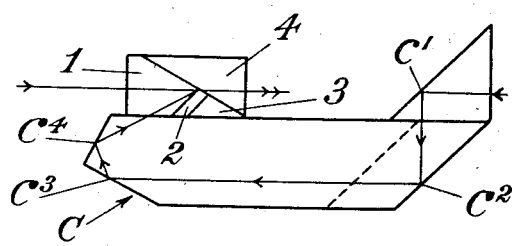
FIG.:8.    FIG.:9.
FIG.:7.
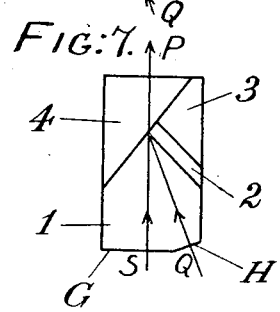   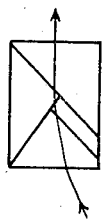   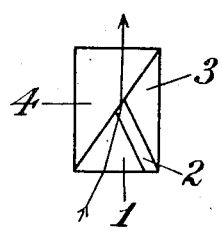
JOHN MARTIN STRANG
JOSEPH HENRY BULL
            INVENTORS
BY Cushman, Darby Cushman
                ATTORNEYS Patented Aug. 10, 1948

2,446,726

UNITED STATES PATENT OFFICE 2,446,726

RANGE FINDER, HEIGHT FINDER, AND LIKE OPTICAL OBSERVATION INSTRUMENT

John Martin Strang and Joseph H. Bull, Glasgow, Scotland, assignors to Barr & Stroud, Limited, Glasgow, Scotland Application December 1, 1944, Serial No. 566,224
In Great Britain January 21, 1943

Section 1, Public Law 690, August 8, 1946
Patent expires January 21, 1963

2 Claims. (Cl. 88—2.6)

This invention refers to rangefinders, heightfinders, and other optical observation instruments of the rangefinder type working on the coincidence principle. In such instruments, two partial images of the object under observation are presented in the observer's field of view and are moved relatively to one another into a predetermined relationship.

In the specification of British Patent No. 9906 of 1908, granted to Archibald Barr and William Stroud, separating prism combinations for coincidence instruments are described, such a prism combination serving to intercept parts of the two beams of light so as to present the partial images on opposite sides of a separating line. According to British Patent No. 9906 of 1908, the separating prism combination consists of three or more pieces of glass of two or more qualities as regards their refractive indices, so arranged that the separating line is constituted by a prism edge which lies in the interior of the prism combination, the separation being effected by the light being differently refracted on opposite sides of that edge.

In the specification of British Patent No. 30,152 of 1909, also granted to Archibald Barr and William Stroud, the same principle of separation by internal refraction is applied to prism combinations having two adjacent separating edges arranged to give a partial image of a narrow strip form.

The present invention is concerned with separating prism combinations of the internal refracting type as described in the two patent specifications above referred to, our experiences having shown that prism combinations of this type in their present form can be improved upon in several respects.

For purposes of explanation, reference will now be made to the accompanying drawing, in which:

Figure 1 is an explanatory diagram illustrating a prism combination of present known form, Figure 2 shows a prism combination made in accordance with the invention, Figure 3 shows a development of the combination shown in Figure 2, and Figures 4, 5, 6, 7, 8 and 9 show six further examples.

Figure 10 shows another example.

Referring to Figure 1, this shows a combination comprising prisms 1, 2, 3, and 4, the prism 2, which is of parallel faced plate form, forming a strip image with separating edges A and $A^1$. The end of prism 2 abuts on a diagonal face containing the separating lines at $AA'$. In the prism combination illustrated the angle BCF at which light meets the entrance face AF of the prism 2 is not equal to the angle $EDA^1$ at which light leaves the emergence face $AA^1$ of that prism. This has two results.

Firstly, the magnification of the image across the separating edges is modified and different from its magnification parallel to the separating edges. The image is thus distorted and circles appear as ellipses. Secondly, the exit pupil of the instrument is altered in dimension, changing, for example, from a circle to an ellipse. This distortion causes the illumination of the strip image to be defective as compared with the main partial image.

According to the present invention, in an instrument of the rangefinder type working on the coincidence principle, a separating prism combination of the internal refracting type is so constructed and arranged that the principal ray of that portion of the image-forming light, which in its path past the separating edge passes through two prism faces meeting at the separating edge and belonging to the same prism, strikes the entrance face of that prism and leaves the emergence face of that prism at substantially the same angle.

In carrying the invention into practice it is necessary to co-ordinate the quality of the glasses of which the component prisms are to be made as regards their refractive indexes and the directions of the light incident to and emergent from the prism combination with the relative angularities of the faces of the component prisms.

The separating prism combination may be adapted to form a strip image in the field of view or to form two partial images in the usual way with a single separating line. Figure 2 shows a prism combination according to the preceding paragraph and of the strip image type.

A second defect which arises in the present design of separating prism combination is that of chromatism. This is caused by white light being split up into different colours in passing through the prism 2 of Figure 1. Thus, if the ray BC, Figure 1, at the entrance face is considered to be white light, differently coloured light emerges in various directions differing from DE at the exit face, only the D colour light (for which refractive indices are measured) emerging in the direction DE. The result of this is that the exit pupil is coloured, having, for instance, an excess of light of long wave lengths at one side of the pupil and of short wave lengths at the other side. When these conditions arise, vision through the instrument is impaired because slight movements of the eye in directions across the strip field cause the general colour of the field to change, taking a bluish or reddish tinge.

According, therefore, to a further feature of the invention, chromatism is removed or reduced by a suitable choice of glasses for the prism combination, the glasses being so chosen that their refractive indices and dispersions are in proper relationship to each other so as to satisfy the condition that the ratio of their refractive indices for light of spectral colour C, for light of spectral colour D, and for light of spectral colour F is the same, as represented by:

$$\frac{n_C^1}{n_C^2} = \frac{n_D^1}{n_D^2} = \frac{n_F^1}{n_F^2}$$

where $n^1$ and $n^2$ are the refractive indices for the two glasses.

Two examples of glasses which fulfil these conditions very well are telescope flint glass and dense barium crown glass, and other two examples are two varieties of barium flint glasses as hereafter specified. Thus, in Figure 2, the prisms 1, 3 and 4 are assumed to be composed of telescope flint glass of refractive index 1.5300 and dispersive power or V value of 51.1 while the prism 2 is of dense barium crown glass of refractive index 1.6110 and dispersive power or V value 58.4.

Figure 10 shows another example of prism combination substantially the same as that shown in Figure 2, but drawn on an enlarged scale, and indicating the path of the light of the refracted beam and of the main beam through the prism combination, and the angles of the component prism elements and of the incident light. The glasses are the same as in Figure 2. The beam of light which forms the second partial image, i. e., the "main" beam, meets the entrance face and leaves the emergence face of the prism combination normal thereto.

In Figure 10, QP is the refracted beam, and the beam of light which forms the second partial image, i. e., the main beam, is shown at SP. The angle of incidence of QP at the entrance face LM is fixed during original design of the instrument, and the axis of main and refracted beams at emergence at the exit face ON and of the main beam at entry at LM are normal to the surface of the combination; moreover, the refractive indexes of the glasses of the refracting prism 2 (that is $n^2$) and of the remaining component prisms 1, 3, 4 (that is $n^1$) are selected in advance.

If the height $h$ of the combination is large relative to the width $w$, see Figure 2, inconvenience may arise because of restriction of the angular field of observation in an eyepiece used in conjunction with this prism combination. To meet this, we may reduce the height to a suitable value by forming surfaces 5 and 6, as shown in Figure 3, which are intersected at intermediate positions in their areas by the oblique surface 7.

Figures 4 to 9 illustrate further forms which prism combinations in accordance with the invention may take.

Figure 4 shows a prism combination made in accordance with the invention, with a single separating line. It comprises three prisms 8, 9 and 10, the prisms 8 and 10 being composed of telescope flint glass and the prism 9 of dense barium crown glass, their refractive indices being respectively 1.5300 and 1.6110, and their dispersive powers or V values 51.1 and 58.4. The separating line is at A.

Figure 5 shows a separating prism combination 1, 2, 3, 4, similar to that shown in Figure 2 in conjunction with an eyepiece prism combination or structure B. Both the main and the refracted beams of light enter the separating prism combination through the same face 11.

Figure 6 shows a separating prism combination 1, 2, 3, 4 in accordance with the invention combined with an eyepiece prism combination or structure C which is designed to reverse the direction of one of the two beams of light, namely the refracted beam. In this case, the beam which is reversed enters the separating prism combination at one side of the latter while the second or main beam enters from one end. The reversal of direction is effected by reflection of the right hand beam at prism faces $c^1$, $c^2$, $c^3$, $c^4$, and refraction in the separating prism combination. In Figure 6 all the prisms except prism 2 are made of telescope flint glass, the prism 2 being made of dense barium crown glass.

Figure 7 shows a separating prism combination in which the light beams SP and QP forming the main and strip images enter through separate faces G and H, the face H being angled so as to receive the refracted beam QP normally.

Figure 8 shows another form from which certain advantageous results are obtained. Its construction will be apparent from the figure, all the prisms except the strip prism being composed of telescope flint glass, the strip prism being composed of dense barium crown glass.

In the example shown in Figure 9, the prisms 1, 3 and 4 which form the main part of the combination are of the higher refractive index, being composed of dense barium crown glass, and the strip prism 2 is of lower refractive index, being composed of telescope flint glass.

Any of the forms shown in Figures 2, 3, 5, 6, 7 and 8 may similarly have the strip prism composed of glass of the lower refractive index, and the remainder of the combination composed of glass of higher refractive index, while in Figure 4 the prism 9 may be of the less dense glass and the prisms 8 and 10 of the denser glass.

As an alternative to telescope flint glass, and dense barium crown glass, a pair of barium flint glasses may be used, having refractive indexes of 1.6446 and 1.5761 and dispersive powers or V values 48.3 and 43.4 respectively.

It will be noted from the drawings that the axis of the main and refracted beams at emergence and of the main beam at entry are normal to the surface of the combination; furthermore, in the construction shown in Figure 6 it will be noted that while the refracting prism 2 is of glass of different refractive index from all the remaining prisms, the refracted beam enters the surface of the structure also normal thereto, but enters the prism combination proper through the side of the prism 1; likewise in Figure 5, the refracted beam enters the prism structure B initially normal to the surface thereof, the beam being bent as required in well-known manner but not shown in the drawing.

We claim:

1. For use in an optical observation instrument of the rangefinder type working on the coincidence principle, a separating prism combination comprising at least three prisms of glass secured together to form a solid body having parallel end faces for light entry and light emergence, a first prism on one side of a diagonal plane at an obliquity of about 67° to the end faces, a refracting prism having a refracting angle of about 122° with said refracting prism face nearer the light entry side of the combination extending inwards to the said diagonal plane intermediate the ends of the first prism and said face forming said refracting angle with said diagonal plane, the refracting prism being of glass of different quality from the other prisms and having a refractive index of about 1.6100, the glass of the other prisms having a refractive index of about 1.5300, the edge of the refracting prism in the interior of the combination constituting a separating line by virtue of the refraction of light at one side of that edge by passage through the refractive prism, the separating prism combination receiving the two beams of light for the formation of partial images in the field of view, said prism combination to be mounted in said instrument with said prism combination positioning the refracting prism with the path of the principal ray of the refracted beam meeting the entrance face and leaving the emergence face of the refracting prism at substantially the same angle, the incident ray meeting the light entry face of the combination at an angle of about 19° to the normal thereto, and the axis of main and refracted beams at emergence and of the main beam at entry being normal to the surface of the combination.

2. For use in an optical observation instrument of the rangefinder type working on the coincidence principle, a separating prism combination comprising four prisms of glass secured together to form a solid body having parallel end faces for light entry and light emergence, a first prism constituting a half of the combination on one side of a diagonal plane at an obliquity of about 67° to the end faces, a refracting prism having a refracting angle of about 122° and of parallel faced plate form extending inwards to the said diagonal plane intermediate the ends of the first prism, one of said parallel faces of the refracting prism being nearer the light entry side of the combination and forming said refracting angle with said diagonal plane, the other two prisms completing said body, the refracting prism being of glass of different quality from the other prisms and having a refractive index of about 1.6100, the glass of the other prisms having a refractive index of about 1.5300, the edge of the refracting prism in the interior of the combination constituting a separating line by virtue of the refraction of light at one side of that edge by passage through the refracting prism, the separating prism combination receiving the two beams of light for the formation of partial images in the field of view, said prism combination to be mounted in said instrument with said prism combination positioning the refracting prism with the path of the principal ray of the refracted beam meeting the entrance face and leaving the emergence of the refracting prism at substantially the same angle, the incident ray meeting the light entry face of the combination at an angle of about 19° to the normal thereto, and the axis of main and refracted beams at emergence and of the main beam at entry being normal to the surface of the combination.

J. MARTIN STRANG.
J. H. BULL.

REFERENCES CITED

The following references are of record in the file of this patent:

UNITED STATES PATENTS

| Number | Name | Date |
| --- | --- | --- |
| 941,125 | Barr et al. | Nov. 23, 1909 |

FOREIGN PATENTS

| Number | Country | Date |
| --- | --- | --- |
| 30,152 | Great Britain | 1909 |

OTHER REFERENCES

Southall: "Mirrors, Prisms, and Lenses," revised edition, pages 491–493. Published by the Macmillan Company, N. Y., 1923. Copy in Div. 7.